US005784009A

United States Patent [19]
Wada et al.

[11] Patent Number: 5,784,009
[45] Date of Patent: Jul. 21, 1998

[54] COMMUNICATION APPARATUS WITH PROGRAMMABLE FUNCTION KEYS

[75] Inventors: Satoshi Wada. Kawasaki; Takehiro Yoshida. Tokyo; Takeshi Ono; Tomoyuki Takeda. both of Yokohama; Masaya Kondo. Tokyo; Makoto Kobayashi. Tama; Takahiro Kato. Yokohama, all of Japan

[73] Assignee: Canon Kabushiki Kaisha. Tokyo, Japan

[21] Appl. No.: 296,974

[22] Filed: Aug. 26, 1994

Related U.S. Application Data

[63] Continuation of Ser. No. 987,243, Dec. 7, 1992, abandoned, which is a continuation of Ser. No. 656,589, Feb. 19, 1991, abandoned.

[30] Foreign Application Priority Data

Feb. 20, 1990 [JP] Japan ......................................... 2-37292

[51] Int. Cl.⁶ ..................................................... H04Q 1/00
[52] U.S. Cl. ............................................. 341/23; 379/93.19
[58] Field of Search ............................. 341/23; 340/711; 455/92; 379/96, 93.19

[56] References Cited

U.S. PATENT DOCUMENTS

| 4,825,200 | 4/1989 | Evans | 341/23 |
| 4,844,637 | 7/1989 | Buisson et al. | 341/23 |
| 4,870,677 | 9/1989 | Di Santo et al. | 379/96 |
| 4,885,574 | 12/1989 | Negishi et al. | 340/711 |
| 4,908,853 | 3/1990 | Matsumoto | 379/355 |
| 4,914,691 | 4/1990 | Berger | 341/23 |
| 4,916,740 | 4/1990 | Noda et al. | 341/23 |

FOREIGN PATENT DOCUMENTS

| 58-161468 | 9/1983 | Japan . |
| 59-189770 | 10/1984 | Japan . |
| 63-300655 | 12/1988 | Japan . |

Primary Examiner—Brian Zimmerman
Attorney, Agent, or Firm—Fitzpatrick, Cella, Harper & Scinto

[57] ABSTRACT

A communication apparatus includes a manipulation element having an undefined communication function to be defined in connection with the manipulation element, and registration element for defining a communication function executable by the communication apparatus, for the undefined manipulation element.

18 Claims, 4 Drawing Sheets

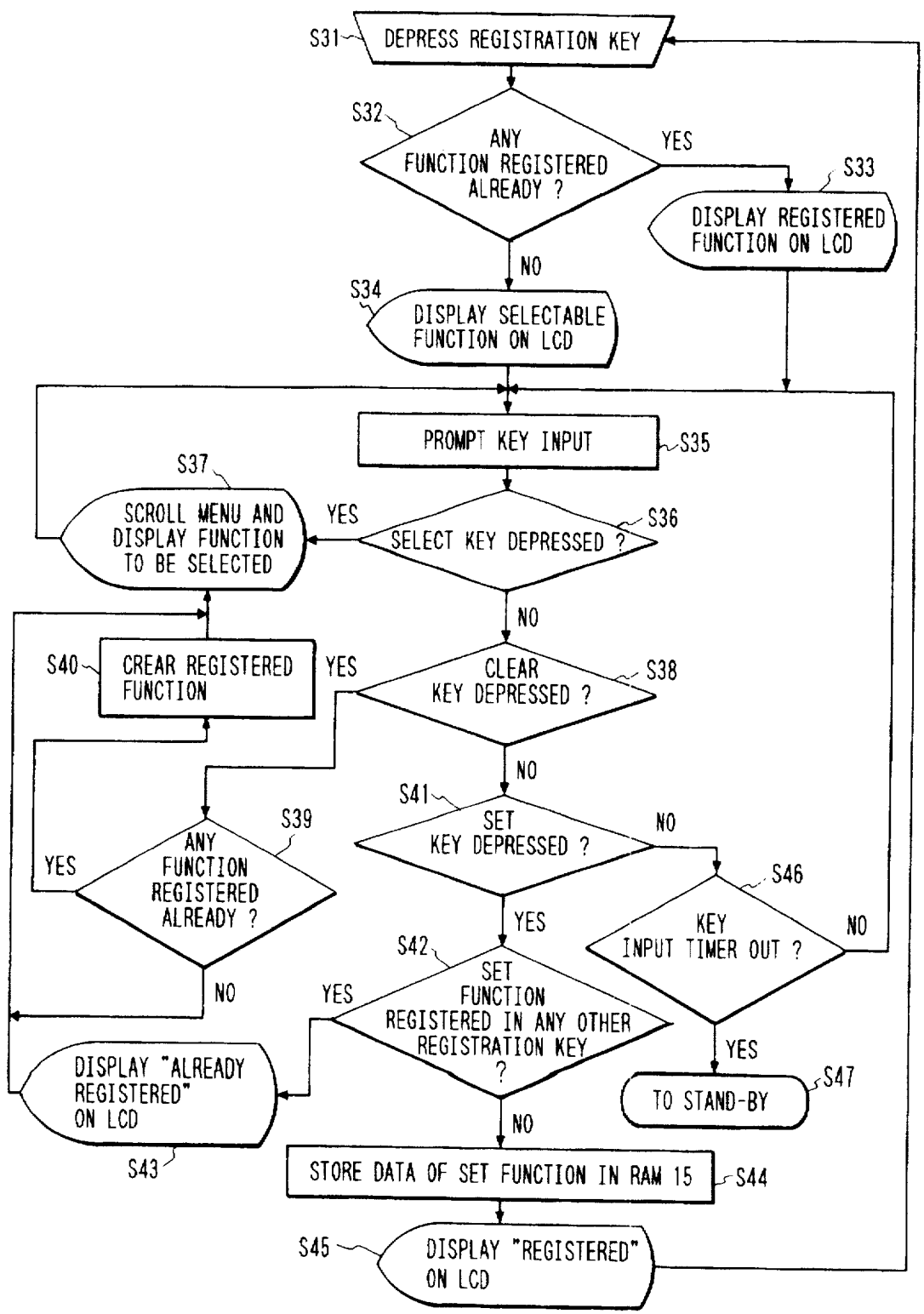

FIG. 4

| REGISTRATION 1 | 0 2 | 15-1 |
|---|---|---|
| REGISTRATION 2 | 0 1 | 15-2 |
| REGISTRATION 3 | 0 0 | 15-3 |

FIG. 5

| 0 1 | ALARM MISSING TRANSMITTAL |
|---|---|
| 0 2 | RELEASE ECM |
| 0 3 | FORCED MEMORY RECEIVE |
| 0 4 | TONE DIALING |
| 0 5 | SELECT SENDER NAME |
| 0 6 | STAMP TO SENT SHEET |
| 0 7 | PERSONAL SEND / RECEIVE |
| 0 8 | RELAY INSTRUCTED TRANSMISSION |
| 0 9 | TIMER TRANSMISSION |
| 0 A | TIMER POLLING |
| 0 B | REGISTER TEL NUMBER |
| 0 C | REGISTER USER DATA |
| 0 D | REGISTER USER SOFT SW |
| 0 E | REGISTER SELECT KEY |
| 0 F | PRINT REPORT |
| 1 0 | STOP MULTI-ADDRESS CALLING |
| 1 1 | SHIFT CURSOR |
| 1 2 | SPACE |
| 1 3 | PAUSE |
| 1 4 | FAX NETWORK |
| 1 5 | SEARCH MENU |
| 1 6 | SET |
| 1 7 | CLEAR |
| 1 8 | RETURN |
| 1 9 | END |
| ⋮ | ⋮ |
| 4 F | |

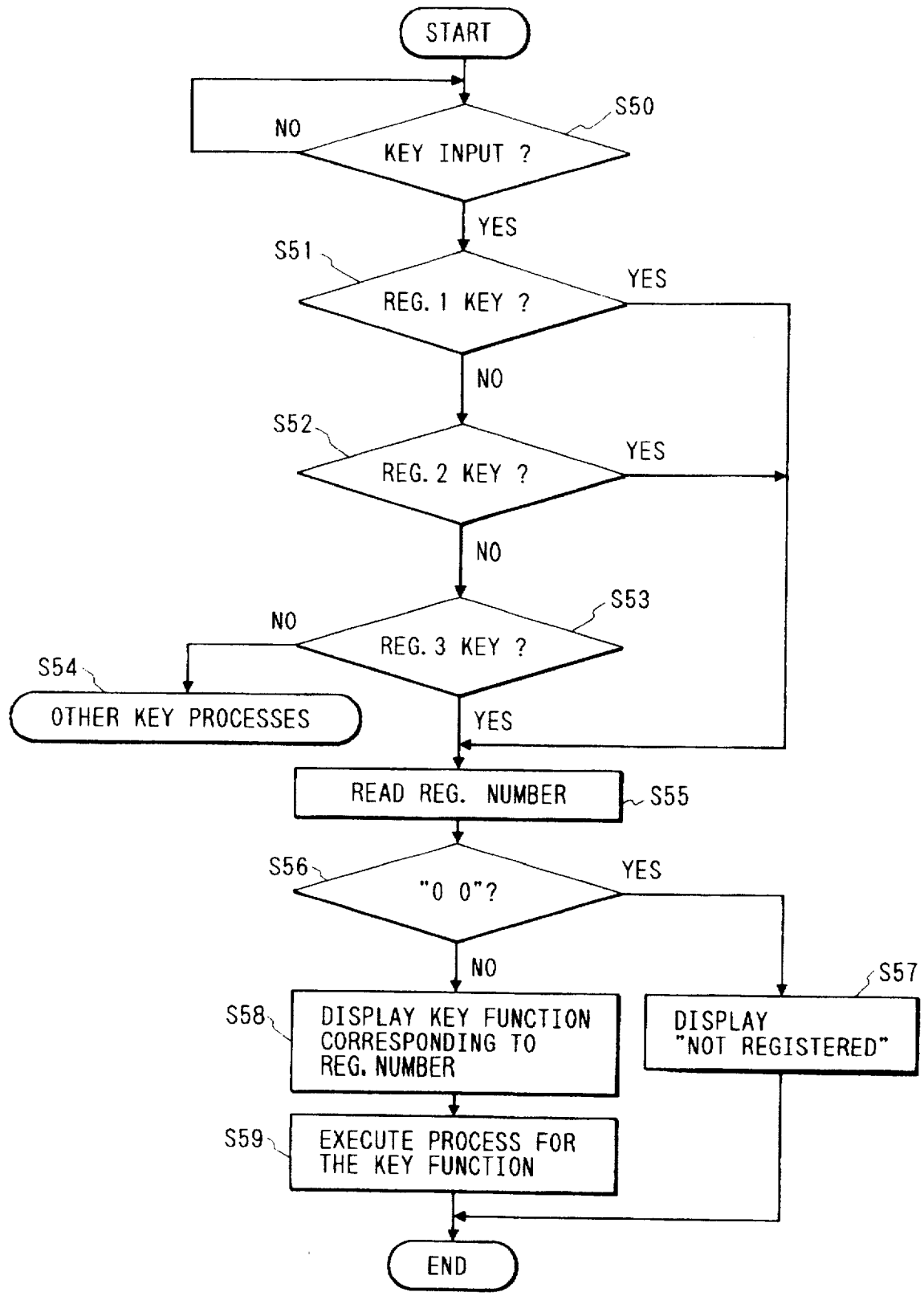

COMMUNICATION APPARATUS WITH PROGRAMMABLE FUNCTION KEYS

This application is a continuation of application Ser. No. 07/987,243 filed Dec. 7, 1992, now abandoned, which is a continuation of application Ser. No. 07/656,589 filed Feb. 19, 1991, which is now abandoned.

BACKGROUND OF THE INVENTION

1. Field of the Invention

The present invention relates to a communication apparatus, and more particularly to a communication apparatus having a console unit such as key entry switches for selecting one of various functions.

2. Related Background Art

Various types of electronic equipment have recently been advanced with regard to their functions and their performance. A facsimile machine is not the exception and a number of functions which have not been previously found in facsimile machines are now being attained.

As a result, an operation method or operation procedure of the machine is becoming fairly complex.

As to the operation method, there is a design philosophy that a number of functions are assigned to respective keys. In this case, however, the number of keys in a console panel increases very much.

In another design philosophy, key(s) for shifting or changing operation modes is provided and a plurality of functions are assigned to each key. In this case, the number of keys may be reduced but a complex operation is required to attain the same additional functions.

Those two prior design philosophies include the following problems.

1) In the former design philosophy, a number of keys are required for the console unit and the cost and the size of the machine increases. From the standpoint of users, only a small number of users utilize all functions of the recent high performance machine. Thus, the keys which are not normally used by the users are arranged on the console panel and the space is wasted.

2) In the latter design philosophy, the number of keys can be reduced, but when the user wants to select a desired function, the operation is complex and an excessive burden is imported to the user, or the function may not be actually used by the user even if the function is very useful to the user.

Applications relating to keys include U.S. Pat No. 4,502,080, U.S. Pat. No. 4,567,322, U.S. Pat No. 4,729,033, U.S. Pat No. 4,833,705, and U.S. Pat No. 4,908,853, but none of them solve the problems described above.

SUMMARY OF THE INVENTION

In the light of the above, it is an object of the present invention to improve a communication apparatus.

It is another object of the present invention to provide a communication apparatus equipped with key entry switches whose function can be set by a user as desired.

It is another object of the present invention to provide a communication apparatus having registration means for registering a key function as desired.

Other objects of the present invention will be apparent from the following description of the preferred embodiments and the accompanying drawings.

BRIEF DESCRIPTION OF THE DRAWINGS

FIG. 3 shows a flow chart of key function registration in the embodiment, FIG. 4 shows a function registration area for a registration key 22 in a RAM 15, FIG. 5 shows a store area of key function data corresponding to key function numbers in the RAM 15, and FIG. 6 shows a flow chart of a key entry routine of the registration key 22.

DETAILED DESCRIPTION OF THE PREFERRED EMBODIMENTS

The preferred embodiments of the present invention are now explained in detail with reference to the accompanying drawings. In the embodiment, a facsimile machine is described as the communication apparatus.

Figure 1:
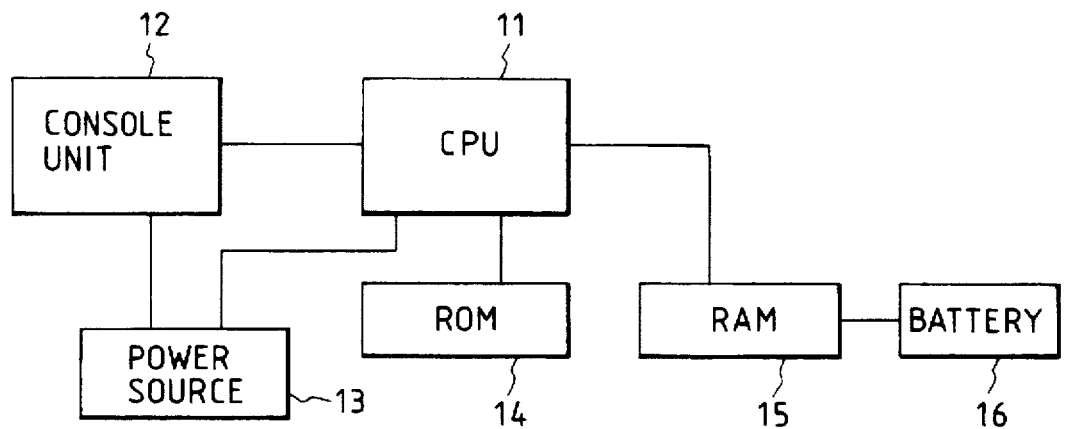
FIG. 1 shows a block diagram of a configuration of a facsimile machine in accordance with one embodiment of the present invention.

FIG. 1 shows a configuration of a facsimile machine in accordance with the present invention.

In FIG. 1, numeral 11 denotes a CPU which may comprise a microprocessor, and numeral 12 denotes a console unit of the present invention. The machine is operated by an input from the console unit. Numeral 13 denotes a main power supply which supplies voltages 5 V, ±12 V and 24 V required by individual system circuits. Numeral 14 denotes a ROM in which a main software program of the machine is stored. A program of the present invention shown in FIG. 3 is also stored in the ROM 14.

Numeral 15 denotes a RAM which is used as a memory for storing various data. Functions assigned to registration keys in the present invention are stored in the RAM 15. Numeral 16 denotes a battery for backing up the data of the RAM 15 even in an off-state of the power supply 13.

Figure 2:
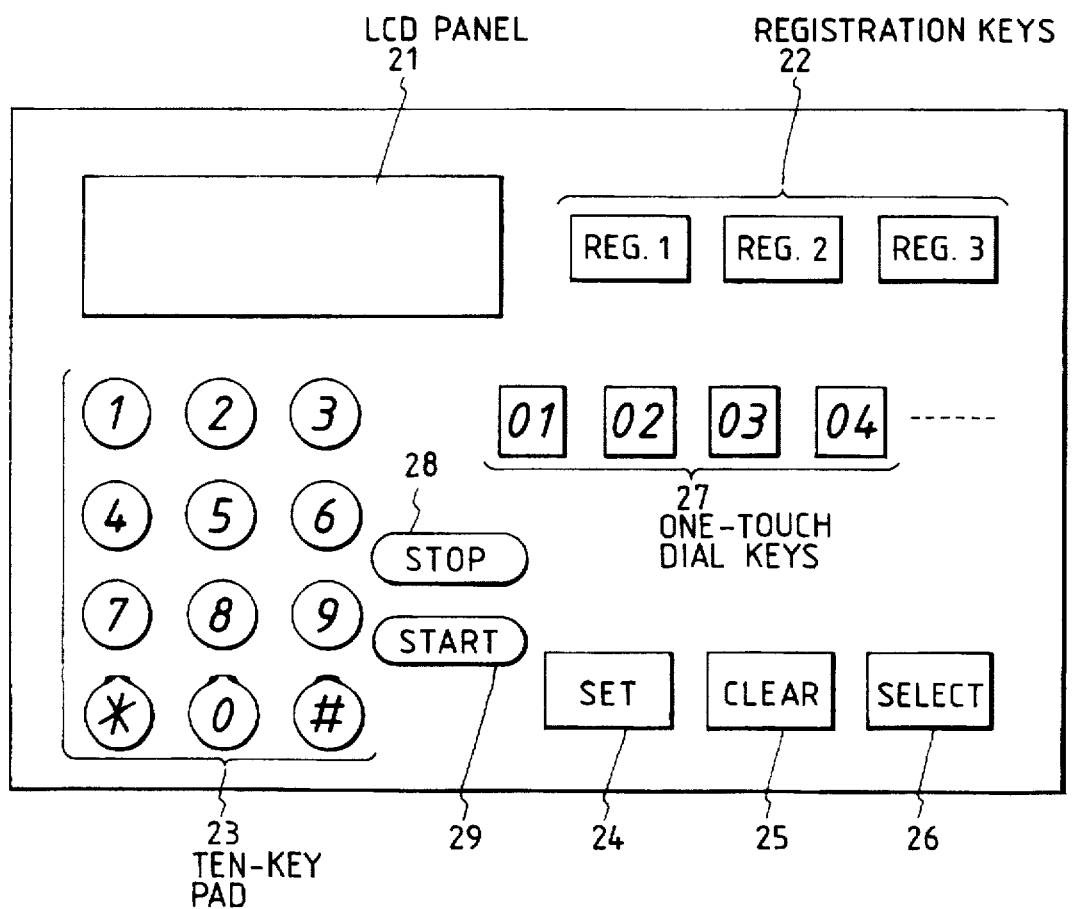
FIG. 2 shows a console unit of the facsimile machine.

FIG. 2 shows an enlarged view of the console unit 12 of FIG. 1. The arrangement of FIG. 2 is based on an arrangement of a conventional facsimile machine. Numeral 21 denotes an LCD panel through which the proceeding of the operation and the operation of the facsimile machine are informed to a user, numeral 22 denotes registration keys which are used to register functions selected by the user, and numeral 23 denotes a ten-key pad which is used to enter a telephone number.

Any number of registration keys 22 may be provided. Numeral 24 denotes a set key for setting a mode for the registration, numeral 25 denotes a clear key for clearing the registered mode, and numeral 26 denotes a selection key for selecting a desired one of several registration modes. Numeral 27 denotes one-touch keys. By depressing one of the keys 27, a telephone number stored in the RAM 15 is called.

Numeral 28 denotes a stop key which is used to terminate the operation of the facsimile machine, and numeral 29 denotes a start key to start a predetermined operation (such as transmission, reception or copy).

FIG. 4 shows a data store area in the RAM 15 of key function numbers registered in the registration keys 22. FIG. 5 shows a list of the registered key function number data and the corresponding function data.

In the present embodiment, the key function numbers 01 to 2F are preregistered, and the key function numbers 30 to 4F are reserved for use for the function expansion. The operator selects any desired key function numbers from the key function number data (sometimes referred to in the specification and claims as "communication mode data") and registers them in areas 15-1, 15-2 and 15-3 in RAM 15, as shown in FIG. 4.

The function corresponding to the key function number 01 is, for example, the selection of alarm mode for missing transmittal. In the alarm mode for missing transmittal, if the number of sheets manually entered by the operator is different from the number of sheets actually transmitted, it is informed to the operator.

In the key function number 02, if a transmission error occurs, an error correction mode (ECM) is inhibited (ECM release) to prevent the selection of the ECM in which error data is automatically resent.

In the key function number 03, a forced memory receive mode is selected so that the received image is temporarily stored in the memory, and after the reception the image is read and printed out.

In the key function number 04, a dialing signal is switched from a pulse signal to a tone signal.

In the key function number 05, a sender name which the operator desires is selected from a plurality of preregistered sender names.

In the key function number 06, a mode to stamp the transmitted document sheet is selected.

In the key function number 07, a personal receive/personal transmit mode is selected.

In the key function number 08, a relay instructed transmission mode is selected.

In the key function number 09, a timer transmission/timer multi-address calling mode is selected.

In the key function number 0A, a timer polling receive/timer multi-polling receive mode is selected.

In the key function number 0B, a mode to register a telephone number to a one-touch dialing key or a present dialing key is selected.

In the key function number 0C, a mode to register a user telephone number or user abbreviation data is selected.

In the key function number 0D, a mode to register data to a user soft switch is selected.

In the key function number 0E, a mode to register data to a select button (not shown) is selected.

In the key function number 0F, a report output mode to record various reports such as a communication management report is selected.

In the key function number 10, the multi-address calling is stopped.

In the key function number 11, a cursor on the LCD panel 21 is moved.

In the key function number 12, a space is inserted between digits or characters to be registered.

In the key function number 13, a pause is inserted in the calling telephone number.

In the key function number 14, a telephone number of a data communication network is sent where the data communication network is used.

In the key function number 15, the registered data or menus are searched.

In the key function number 16, the items are set.

In the key function number 17, the data is cleared if wrong digits or characters are registered.

In the key function number 18, the registration of the current item is terminated and the registration of the next item is started.

In the key function number 19, the registration of data is terminated.

Other various key functions as well as their function numbers are also registered in the RAM 15.

FIG. 3 shows a registration control process of the registration key 22 by the CPU 11 of the machine shown in FIGS. 1 and 2. The process is stored in the ROM 14 as the control program for the CPU 11.

In a step S31, one of the registration keys 22 is depressed. In a step S32, whether any function has been registered in the depressed key or not is determined (00 indicates no registration of the function).

If it has been registered, the function is displayed on the LCD panel 21 (step S33) and the process stands by for a key entry in a step S35. If no function has been registered, selectable functions are displayed on the LCD panel 21 (step S34) and the process proceeds to the step S35.

In a step S36, if the depressed key is the selection key 26, one of the functions is selected by scrolling the function menu shown in FIG. 5 in a step S37 and the process returns to the step S35. In a step S38, if the depressed key is the clear key 25, whether anything has been registered to the registration key to which a function is to be registered is determined in a step S39.

If something has been registered, the memory area of the RAM 15 in which the function has been stored is cleared in a step S40, and the process proceeds to a step S37. If nothing has been registered, the process directly proceeds to the step S37.

In a step S41, if the depressed key is the set key 24, whether the selected function to be registered has been registered to another registration key or not is determined in a step S42. If it has been registered, "Already registered in registration key OO" is displayed on the LCD panel 21 in a step S43 and the process proceeds to the step S37.

In the step S42, if the selected function has not been registered in any registration key, the process proceeds to a step S44 to store the data of the key function number corresponding to the selected function in the memory area of the RAM 15 shown in FIG. 4. In a step S45, "Registered" is displayed on the LCD panel 21 and the process returns to the step S31.

In a step S46, a key entry time is managed, and if no key is depressed in a predetermined time period, the key entry timer is timed out and the process stands by in a step S47.

FIG. 6 shows a flow chart of a key entry control operation when the registration key 22 is depressed.

In a step S50, the presence or absence of a key entry is determined. If there is key entry and if there is a key entry for one of the registrations 1, 2 and 3 in steps S51, S52 and S53, the process proceeds to a step S55 and the data of the key function number corresponding to the registration keys is read from the RAM 15. If the entry key is other than the registration keys 22, the process proceeds from the step S53 to a step S54 and executes the process for the key entry.

In the step S55, the key function number data is read from the RAM 15. In a step S56, whether the key function number data is "00" or not is determined. If it is "00", it means that the key function has not been registered and the unregistration of the depressed registration key is displayed on the LCD 21 in a step S57. Then, the process is terminated.

In the step S56, if the key function number data is not "00", the data of the key function corresponding to the key function number data is read from the area of the RAM 15 shown in FIG. 5 in a step S58 and the data of the key function is displayed on the LCD 21. In a step S59, the key function is processed.

Assuming that the key function number data shown in FIG. 4 has been registered in the registration 1 key and the registration 1 key is depressed, the key function data "02" of FIG. 5 is read and the ECM release mode to inhibit the ECM is selected. Accordingly, in this case, the registration 1 key functions as an ECM release key.

In accordance with the present embodiment, the user selects the functions which a user may frequently use and registers those functions in the registration keys. Accordingly the operation is simplified, the number of keys in the console panel is reduced and the reduction of the cost and size of the machine is facilitated.

Since the user may select the functions which the user really desires to use out of the added functions of the facsimile machine, a small number of keys on the console panel may be effectively utilized, the waste is eliminated, the practice to operate the machine is ready, and the desired function can be input by a very simple operation.

In the above embodiment, the set key 24 and the clear key 25 are separately arranged although those keys may be shared with the start key 28 and the stop key 29. In this case, the keys on the console panel can be further reduced and the further reduction of the cost and size is attained.

While the facsimile machine has been described in the above embodiment, the present invention is not limited to the facsimile machine but it is applicable to various communication apparatuses such as a telex or a teletex.

The present invention is not limited to the above embodiment but various modifications thereof may be made.

We claim:

1. In data communication apparatus, the combination comprising:
    a plurality of function registration keys;
    a key function memory for storing a plurality of key functions, each identified by a corresponding key function number with at least one of the key functions specifying a type of data communication;
    a display means for displaying the plurality of key functions;
    a manual selector for selecting a different key function from the displayed plurality of key functions to be associated with each of said plurality of keys;
    a registration memory having a memory location assigned to each of said plurality of keys for registering the key function number identifying the key function selected for a key by said manual selector; and
    a processor responsive to the operation of a given key for performing a process in accordance with the key function stored in said key function memory as identified by the key function number stored in the memory location assigned to the given key in the registration memory.

2. The apparatus according to claim 1, including clear means for clearing the key function number assigned to a key in said registration memory.

3. The apparatus according to claim 1, wherein said key function memory is a table memory.

4. The apparatus according to claim 1, wherein said manual selector comprises a select-key.

5. The apparatus according to claim 1, wherein said registration memory registers the key function number identifying the key function selected for a key by said manual selection the basis of an operation of a manual set-key.

6. The apparatus according to claims 1, wherein said processor performs a facsimile communication process.

7. A method of operating a data communication apparatus including a plurality of function registration keys; a key function memory for storing a plurality of key functions, each identified by a corresponding key function number with at least one of the key functions specifying a type of data communication; a display means for displaying the plurality of key functions; a manual selector for selecting a different key function from the displayed plurality of key functions to be associated with each of said plurality of keys; a registration memory having a memory location assigned to each of said plurality of keys for registering the key function number identifying the key function selected for a key by said manual selector; and a processor responsive to the operation of a given key for performing a process in accordance with the key function stored in said key function memory as identified by the key function number stored in the memory location assigned to the given key in the registration memory, said method comprising the steps of:
    depressing a registration key to determine if a key function number is registered for the depressed key in the registration memory, and if a key function number is registered, displaying the corresponding key function on said display means, and if not registered, displaying selectable ones of the key functions on said display means; and
    selecting by said manual selector one of the selectable key functions displayed on said display means, and registering the corresponding key function number in the memory location in the registration memory assigned to the depressed registration key.

8. The method according to claim 7, including a clear step of clearing the key function number assigned to a key in said registration memory.

9. The method according to claim 7, wherein said key function memory is a table memory.

10. The method according to claim 7, wherein said manual selects comprises a select-key.

11. The method according to claim 7, wherein said registration memory registers the key function number identifying the key function selected for a key by said manual selector on the basis of an operation of a manual set-key.

12. The method according to claim 7, wherein said processor performs a facsimile communication process.

13. In data communication apparatus, the combination comprising:
    a plurality of function registration keys;
    a key function memory for storing a plurality of key functions, each identified by a corresponding key function number with at least one of the key functions specifying a type of data communication;
    a display means for displaying the plurality of key functions;
    a registration memory having a memory location assigned to each of said plurality of keys for registering a key function number identifying a selected key function;
    means for determining if a key function number is registered for a given one of said plurality of function registration keys in response to the depression of the given key, and if a key function number is registered, displaying the corresponding key function on said display means, and if not registered, displaying selectable ones of the key functions on said display means;
    a manual selector for selecting one of the selectable key functions displayed on said display means, and registering the corresponding key function number in the memory location in the registration memory assigned to the depressed registration key; and
    a processor responsive to the operation of the given key for performing a process in accordance with the key function stored in said key function memory as identified by the key function number stored in the memory location assigned to the given key in the registration memory.

14. The apparatus according to claim 13, including clear means for clearing the key function number assigned to a key in said registration memory.

15. The apparatus according to claim 13, wherein said key function memory is a table memory.

16. The apparatus according to claim 13, wherein said manual selector comprises a select-key.

17. The apparatus according to claim 13, wherein said registration memory registers the key function number identifying the key function selected for a key by said manual selector on the basis of an operation of manual set-key.

18. The apparatus according to claim 13, wherein said processor performs a facsimile communication process.

* * * * *

UNITED STATES PATENT AND TRADEMARK OFFICE
CERTIFICATE OF CORRECTION

PATENT NO. : 5,784,009

DATED : July 21, 1998

INVENTOR(S): SATOSHI WADA ET AL.

It is certified that error appears in the above-identified patent and that said Letters Patent is hereby corrected as shown below:

COLUMN 6

Line 32, "selects" should read --selector--.

Signed and Sealed this

Eleventh Day of May, 1999

Attest:

Q. TODD DICKINSON

*Attesting Officer*    *Acting Commissioner of Patents and Trademarks*